(No Model.)
G. MIOT.
INDUCTOMETER.
No. 386,648. Patented July 24, 1888.
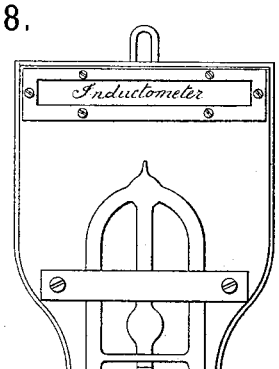
Fig. 1
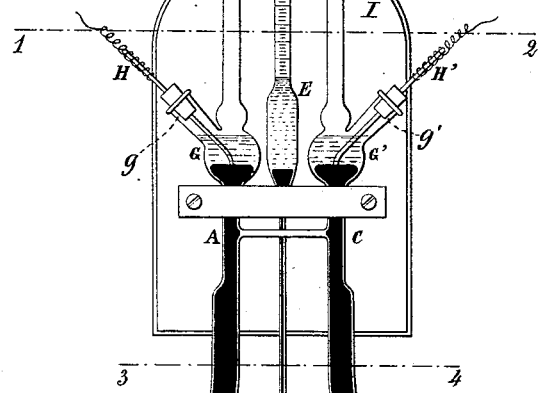
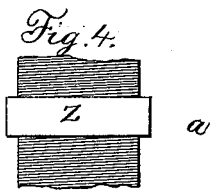
Fig. 4.
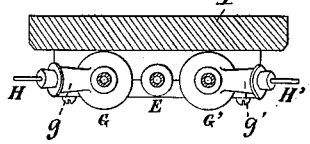
Fig. 2
Fig. 3
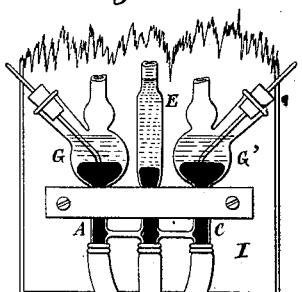
Fig. 1 bis
Attest.
Geo. T. Smallwood.
Philip Mauro.
Inventor:
Georges Miot by
A. Pollok
his attorney.
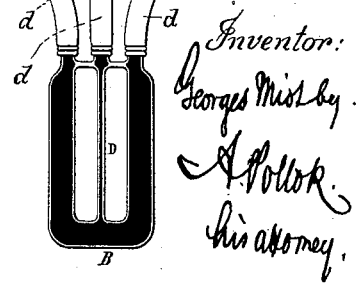

UNITED STATES PATENT OFFICE.

GEORGES MIOT, OF PARIS, FRANCE.

INDUCTOMETER.

SPECIFICATION forming part of Letters Patent No. 386,648, dated July 24, 1888.

Application filed March 7, 1888. Serial No. 266,480. (No model.) Patented in France September 13, 1887, No. 185,799, and in Germany November 5, 1887, No. 5,470.

*To all whom it may concern:*

Be it known that I, GEORGES MIOT, of Paris, in the Republic of France, have invented a new and useful Improvement in Apparatus for Measuring Intensity of Magnetic Fluids, called an "Inductometer," (which has been patented in France by Letters Patent No. 185,799, dated September 13, 1887, and in Germany by Letters Patent dated November 5, 1887, application No. 5,470, class XXI,) which is fully set forth in the following specification.

This invention relates to an apparatus which I call an "inductometer," and which is intended to measure the intensity of the electric current in any magnetic field. It is based upon the principle that if upon the horizontal branch of a U-shaped tube is placed a capillary tube in such manner as to be parallel with the other branches of the U, and said branches be filled with mercury, through which an exciting-current is passed, and if the horizontal part of the tube be placed in the magnetic field with the said horizontal and capillary tubes at right angles to the line of magnetic force, the mercury will rise in the capillary tube to a higher level, the height being proportionate to the intensity of the magnetic field and to the strength of the current.

In the accompanying drawings, which form part of this invention, Figure 1 is an elevation of an apparatus constructed in accordance with the invention; Fig. 1$^{bis}$, a similar view of the lower portion of a modified form of apparatus; Fig. 2, a cross-section on line 1 2 of Fig. 1; Fig. 3, a cross section on line 3 4, and Fig. 4 is a diagram illustrating the mode of using the apparatus.

The apparatus consists, essentially, of a tube, A B C, the lower portion of which is flattened in such a way that it can be placed in a short magnetic field, such as found in dynamo-electric machines. To the base B is soldered a capillary tube, D, which is surmounted by a bulb, E, above which rises a graduated tube, F. Two other bulbs, G G', are placed upon the extremities of the U-shaped tube, and are provided with branch tubes $g\ g'$, into which the mercury is poured until its level reaches to about the middle of the three bulbs. Then on top of the mercury are poured several drops of glycerine into the bulbs G G' and a few drops of water or alcohol into the tube F.

In order to preserve the mercury and other liquid from contact with the air, the U-shaped tube may be prolonged above the two bulbs to unite again with the central tube at the top of the apparatus, as shown in Fig. 1. In this way the liquids are inclosed in an atmosphere of their own, having no communication with the external air.

The instrument is fixed upon a wooden base or support, I.

In order to measure the intensity of the magnetic field by this apparatus, metal rods H H' are introduced through the tubular branches $g\ g'$ into the bulbs G G', so that their ends are immersed in the mercury. The rods H H' are then connected with the poles of a generator, and the part B of the tube is placed in the magnetic field to be examined or investigated, and with the tubes B and D at right angles to the line of magnetic force. The mercury will immediately rise in the bulb E and force up the liquid therein, which may be colored, into the tube F. The diameter of the latter being much smaller than that of the bulb, the movements of the liquid therein are correspondingly amplified.

Referring to Fig. 4, if it is desired to measure at the point $a$ the intensity of the field of a magnet-pole, Z, it suffices to place at $a$ the part of the apparatus representing the intersection of the horizontal tube B with the middle tube, D, to pass through the tube B a known current of, say, from one to ten ampères, and to read the change of level produced in the column of colored liquid in the tube F. If $d$ represents this height read on the scale F and I be the intensity of the current traversing the apparatus at $a$, then the magnetic force H at that point will be represented by $\frac{d}{K\,I}$, K being the constant of the instrument. The rise of the mercury is due to the magnetic force on the electric current traversing the tube B, which is the same as a magnetic field exerts on any electric current placed therein.

For the examination of a vertical field it would suffice to curve the lower part of the tube at right angles. The instrument may be adapted to serve for the purpose of exploring any magnetic field by detaching the lower portion of the U-shaped tube below the bulbs, as shown in Fig. 1$^{bis}$, and connecting it with the upper portion by three flexible tubes, $d$.

It is obvious that other modifications may be made in the details of construction without departing from the spirit of the invention.

I claim—

1. The described apparatus for measuring the intensity of a magnetic field, said apparatus comprising a U-shaped tube, a capillary tube connected with the horizontal part thereof, and a graduated tube above the capillary tube, the U-shaped tube being filled with mercury and adapted for connection in an electric circuit, substantially as set forth.

2. In an inductometer, the combination of the U-shaped tube filled with mercury, and having branch tubes through which pass conductors for including the mercury in an exciting-circuit, a vertical capillary tube connected with the horizontal part of the former tube and surmounted by a bulb, and a graduated tube connected with said bulb, substantially as described.

3. An inductometer comprising the U-shaped tube, the capillary tube, and the bulbs, the lower portion of said tubes being connected with the upper part thereof by flexible coupling-tubes, substantially as and for the purpose set forth.

In testimony whereof I have signed this specification in the presence of two subscribing witnesses.

MIOT (GEORGES.)

Witnesses:
V. BIDAUR,
G. DUPONT.